United States Patent
Cymbal

(10) Patent No.: US 9,623,851 B1
(45) Date of Patent: Apr. 18, 2017

(54) VEHICLE BRAKING APPARATUS, AND METHODS OF USE AND MANUFACTURE THEREOF

(71) Applicant: Honda Motor Co., Ltd., Tokyo (JP)

(72) Inventor: Christopher J. Cymbal, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/136,642

(22) Filed: Apr. 22, 2016

(51) Int. Cl.
*G06F 7/00* (2006.01)
*B60T 8/1766* (2006.01)
*B60T 8/1763* (2006.01)

(52) U.S. Cl.
CPC ........ *B60T 8/1766* (2013.01); *B60T 8/17636* (2013.01); *B60T 2210/12* (2013.01)

(58) Field of Classification Search
CPC . B60T 8/1766; B60T 8/17636; B60T 2210/12
USPC ......... 701/31.3, 31.4, 31.5, 34.3, 34.4, 32.7, 701/32.9, 33.7, 36, 29.1, 45, 80; 340/442, 340/447
See application file for complete search history.

(56) References Cited

U.S. PATENT DOCUMENTS

| | | | | |
|---|---|---|---|---|
| 6,862,511 B1 * | 3/2005 | Phillips | .................... | B60K 5/08 701/54 |
| 7,313,467 B2 * | 12/2007 | Breed | .................... | G07C 5/008 307/9.1 |
| 7,663,502 B2 * | 2/2010 | Breed | .................... | B60C 11/24 340/12.25 |

* cited by examiner

*Primary Examiner* — Mcdieunel Marc
(74) *Attorney, Agent, or Firm* — Kenealy Vaidya LLP

(57) ABSTRACT

Some embodiments are directed to a brake system for use with a vehicle. The brake system can include a sensor that is configured to sense at least one condition relating to interaction between at least one wheel of the vehicle and a surface upon which the vehicle travels. A controller can receive data from the sensor and be configured to instruct a brake modulator to cause a front brake assembly to modulate the speed of rotation of a front wheel via one of a normal mode and a pulsing mode based on the sensed data. The controller can also be configured to instruct the brake modulator to cause a rear brake assembly to modulate the speed of rotation of a rear wheel via the pulsing mode if the front brake assembly is engaged in reducing the speed of rotation of the front wheel via the pulsing mode.

20 Claims, 2 Drawing Sheets

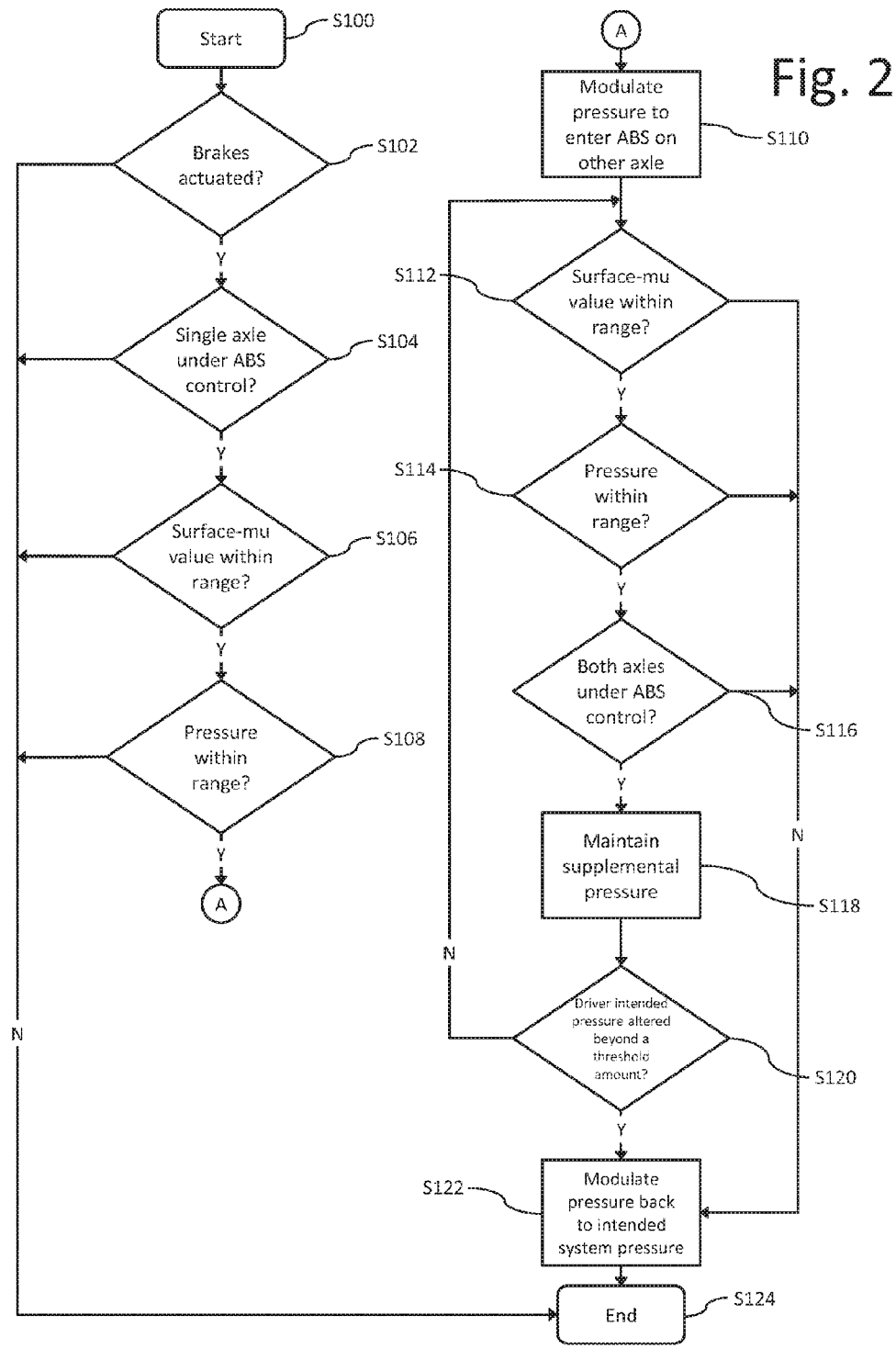

VEHICLE BRAKING APPARATUS, AND METHODS OF USE AND MANUFACTURE THEREOF

BACKGROUND

The disclosed subject matter relates to vehicle braking apparatus, and methods of use and manufacture thereof. More particularly, the disclosed subject matter relates to methods and apparatus for enhancing braking efficiency of vehicles that include multiple rotating wheels.

Various types of vehicles are propelled for travel on land, such as along an improved or unimproved path of travel, via multiple wheels (including tires), such that the vehicle's motion is effected via rotation of the wheels. Some of the vehicles include a pair of front wheels disposed at laterally opposite sides of the vehicle and a pair of rear wheels. The pair of front wheels can be rotatably mounted to a respective hub (also referred to as a wheel carrier or a knuckle). The front wheel hubs can be connected to the vehicle by a respective independent suspension assembly, or by a common beam. In either arrangement, the pair of front wheels can be collectively referred to as a front axle. The pair of rear wheels can be associated with a corresponding structure; i.e., a respective wheel hub, and an independent suspension or a common beam, and can be referred to collectively as a rear axle.

SUMMARY

Numerous types of braking systems can be used to slow rotation of the wheels to thereby reduce vehicle speed. For example, a brake assembly can be provided at each wheel. Each brake assembly can include a rotating element that is rigidly connected to, and that rotates with, the wheel (or the rotatable portion of the wheel hub) and a stationary element that can be attached to elements of the vehicle frame so as not to be rotatable with the wheel, and can be disposed adjacent the rotating element. In a brake assembly configured as a disc brake assembly, the rotating element can be a disc, and the stationary element can include a caliper that houses at least one piston, and at least one brake pad movable in response to fluid pressure acting on the piston. In a brake assembly configured as a drum brake assembly, the rotating element can be configured as a drum, and the stationary element can include a pad on each of a pair of shoes that pivot into and out of engagement with the inner cylindrical surface of the drum. The shoes can be actuated by a mechanical linkage such as but not limited to a cable, or a piston subjected to fluid pressure.

In order to reduce the wheel's speed of rotation, the brake caliper or shoe can be manipulated to press the brake pad(s) against a face or surface of the brake disc or drum. This contact between the brake pad(s) and the brake disc or drum results in friction and reduces the rotational speed of the brake disc or drum, which correspondingly reduces the speed of rotation of the wheel by virtue of the rigid connection between the brake disc and the wheel. This manipulation of the caliper (to press the brake pad(s) against the brake disc) can be accomplished in various ways, such as via the selective supply of hydraulic fluid to the calipers through hydraulic lines or pneumatic fluid through pneumatic lines.

These and other types of braking systems are subject to various challenges. For example, it is beneficial to control the braking, and in particular the reduction in rotational speed of the wheels, so as to maintain the brake torque that the stationary element applies to the rotatable element without breaking the grip between the tire and the travel surface. If the tires losses grip with the travel surface and slides, the stopping distance can increase.

The grip between the tire and the travel surface is a function of the coefficient of friction (represented the Greek letter p, and also referred to as surface-mu) associated with the travel surface. For example, the surface-mu for asphalt has a relatively high value, and the surface-mu for an ice covered surface has a relatively low value. Maintaining each tire's grip with the travel surface can enhance control over the vehicle's path of travel (i.e., steering), and can enhance vehicle braking (i.e., reduces the stopping distance or length of travel of the vehicle from application of braking pressure until the vehicle becomes stationary). For example, locking the wheels (stopping rotation of the wheels) while the vehicle continues to travel can result in a loss of steering control and thus an inability to control the vehicle's direction of travel and also can negatively impact vehicle stopping distance. Furthermore, slipping of the wheels (disproportionate rotational velocity of the wheels compared to vehicle speed) can have similar detrimental effects on vehicle control, such as increased stopping distance.

Locking or slipping of the wheels can occur in a variety of circumstances. For example, the wheels may lock or slip when the vehicle is traveling at a very high speed, and a relatively large amount of pressure is applied to the brake disc by the brake pad(s). However, application of a lower amount of pressure to the brake disc may also cause the wheels to lock or slip if the surface upon which the vehicle travels is slippery, such as due to the presence of snow, ice, rain, etc. In other words, locking or slipping of the wheels is more likely under relatively low surface-mu conditions.

Antilock brake systems (ABS) can be used to enhance brake performance, such as under the circumstances discussed above. Some ABS control the brake caliper so that the brake pad(s) apply intermittent pressure to the brake disc to prevent (or reduce the likelihood of) the wheels locking or slipping while the vehicle continues to move along the surface. This intermittent pressure can be achieved by pulsing the hydraulic fluid pressure supplied to the brake calipers. ABS can be initiated under a variety of conditions, such as based on sensed conditions relevant to the interaction between the wheels and the surface on which the vehicle travels, which as discussed above is at least partially dependent upon the magnitude of the pressure applied to the brake wheel by the brake pad(s), the surface-mu value of the surface on which the vehicle travels, etc.

Another strategy to enhance braking performance involves controlling the front brake calipers so that the associated brake pad(s) apply a higher pressure to the front brake disc, than is applied by the brake pad(s) associated with the rear brake disc. This strategy can accommodate the weight shift onto the front axle, and off of the rear axle, when the vehicle brakes.

This strategy of applying more pressure to the front brake disc than to the rear brake disc can be combined with ABS, so that ABS is engaged for the front braking assemblies by virtue of the higher pressure applied by the front brake pad(s) to the front brake calipers. However, only applying ABS (i.e., pulsing pressure to the brake disc) to the front brake assemblies may not yield the desired brake performance, and thus it may be beneficial to also apply ABS to the rear brake assemblies. More particularly, it may be beneficial to modulate the magnitude of hydraulic fluid pressure applied to the rear brake calipers to initiate ABS for the rear brake assemblies when the front brake assemblies are determined to be operating via ABS. In other words, it may be beneficial to automatically cause the rear brake assembly to operate under ABS when the ABS is engaged for the front brake assemblies.

Alternate embodiments are intended to include a braking system that can rely on electric actuators and electrical communication lines for actuation of the stationary member. For example, an electric motor can be mounted directly on a brake caliper to thereby move a piston to actuate the caliper. In such a configuration, motors can actuate the rear brake calipers directly and without the use of hydraulic fluid, to initiate ABS for the rear brake assemblies when the front brake assemblies are determined to be operating via ABS.

Some embodiments are therefore directed to a brake system for use with a vehicle that includes front and rear wheels that are configured for rotation on a surface upon which the vehicle travels. The brake system can include multiple brake assemblies including a front brake assembly provided at the front wheel, and a rear brake assembly provided at the rear wheel. A brake modulator can be configured to cause each of the brake assemblies to engage and thereby reduce speed of rotation of the associated wheel, via one of a normal mode in which the brake assembly substantially continuously reduces speed of rotation, and a pulsing mode in which the brake assembly sporadically modulate speed of rotation. A sensor can be configured to sense at least one condition relating to interaction between at least one of the wheels and the surface upon which the vehicle travels. A controller can receive data from the sensor and be configured to instruct the brake modulator to cause the front brake assembly to modulate the speed of rotation of the front wheel via one of the normal mode and the pulsing mode based on the sensed data. The controller can also be configured to instruct the brake modulator to cause the rear brake assembly to modulate a braking force applied to the rear wheel until the rear wheel begins slipping, and then to instruct the rear brake assembly to modulate the speed of rotation of the rear wheel via the pulsing mode if the front brake assembly is engaged in reducing the speed of rotation of the front wheel via the pulsing mode.

Some other embodiments are directed to a control assembly for a brake system for a vehicle that includes front and rear wheels that are configured for rotation on a surface upon which the vehicle travels. The brake system can include multiple brake assemblies including a front brake assembly provided at the front wheel, and a rear brake assembly provided at the rear wheel; and a brake modulator that is configured to cause each of the brake assemblies to engage and disengage and thereby reduce speed of rotation of the associated wheel, via one of a normal mode in which the brake assembly substantially continuously reduces speed of rotation, and a pulsing mode in which the brake assembly sporadically modulates speed of rotation. The control assembly can include a sensor that is configured to sense at least one condition relating to interaction between at least one of the wheels and the surface upon which the vehicle travels. The control assembly can also include a controller that receives data from the sensor and that is configured to instruct the brake modulator to cause the front brake assembly to modulate the speed of rotation of the front wheel via one of the normal mode and the pulsing mode based on the sensed data. The controller can also be configured to instruct the brake modulator to cause the rear brake assembly to modulate a braking force applied to the rear wheel until the rear wheel begins slipping, and then to instruct the rear brake assembly to modulate the speed of rotation of the rear wheel via the pulsing mode if the front brake assembly is engaged in reducing the speed of rotation of the front wheel via the pulsing mode.

Still other embodiments are directed to a method of operating a brake system for a vehicle that includes front and rear wheels that are configured for rotation on a surface upon which the vehicle travels. The brake system can include multiple brake assemblies including a front brake assembly provided at the front wheel, and a rear brake assembly provided at the rear wheel; and a brake modulator that is configured to cause each of the brake assemblies to disengage and thereby modulate speed of rotation of the associated wheel, via one of a normal mode in which the brake assembly substantially continuously reduces speed of rotation, and a pulsing mode in which the brake assembly sporadically modulates speed of rotation. The method can include: sensing at least one condition relating to interaction between at least one of the wheels and the surface upon which the vehicle travels; instructing the brake modulator to cause the front brake assembly to modulate the speed of rotation of the front wheel via one of the normal mode and the pulsing mode based on the sensed at least one condition; and instructing the brake modulator to cause the rear brake assembly to modulate a braking force applied to the rear wheel until the rear wheel begins slipping, and then to instruct the rear brake assembly to reduce the speed of rotation of the rear wheel via the pulsing mode if the front brake assembly is engaged in reducing the speed of rotation of the front wheel via the pulsing mode.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 2 is a flowchart depicting an algorithm in accordance with the disclosed subject matter.

DETAILED DESCRIPTION OF EXEMPLARY EMBODIMENTS

Figure 1:
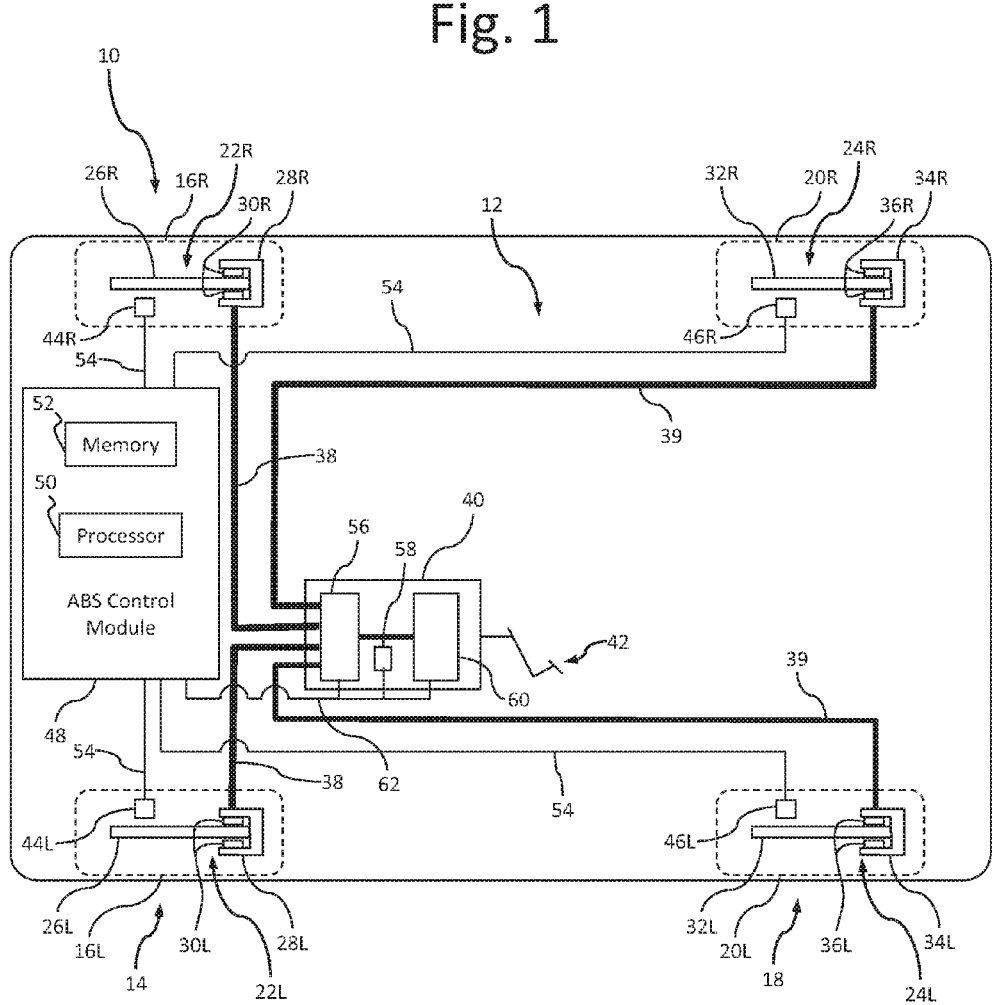
FIG. 1 is a schematic view of a braking system for a vehicle in accordance with the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overview

FIG. 1 is a schematic view of a braking system 12 for a vehicle 10 in accordance with the disclosed subject matter. The vehicle 10 shown in FIG. 1 can be configured for use on paved roadways, and can be referred to as a passenger vehicle. However, the braking system 12 can be used with any vehicle that is configured to travel along any one or combination of improved, unimproved, and/or unmarked roadways and paths constituted by gravel, dirt, sand, etc. For example, embodiments are intended to include or otherwise cover any other type of automobile, including passenger car, truck, ATV, etc.

As described below and shown in the exemplary embodiment of FIG. 1, the braking system 12 includes disc brakes. However, alternate embodiments of the braking system 12 can include any other type of braking system, such as drum brakes, regenerative brakes, etc. The exemplary embodiment of the braking system 12 described below can rely on a hydraulic fluid for actuation of the stationary member into engagement with the rotatable member. However, exemplary embodiments are intended to include a braking system 12 that can rely on pneumatic fluid, or electric actuators and electrical communication lines (also referred to as a brake-by-wire system) for actuation of the stationary member.

II. Braking System

The exemplary vehicle 10 of FIG. 1 can include a pair of front wheels 16L,R referred to collectively as a front axle 14, and a pair of rear wheels 20L,R referred to as a rear axle 18. The front wheels 16L,R and the rear wheels 20L,R can each include hubs, rims, and tires. Front brake assemblies 22L,R and rear brake assemblies 24L,R of the braking system 12 are respectively provided adjacent the hubs of the front wheels 16L,R and the rear wheels 20L,R. The front brake assemblies 22L,R can include a rotating member that rotates with the respective front wheels 16L,R, and a stationary member that selectively engages the rotating member to slow rotation of the rotating member.

In the exemplary embodiment of FIG. 1, the front brake assemblies 22L,R include front brake discs 26L,R, front brake calipers 28L,R, and front brake pads 30L,R. Similarly, in the FIG. 1 embodiment, the rear brake assemblies 24L,R include rear brake discs 32L,R, rear brake calipers 34L,R, and rear brake pads 36L,R. However, exemplary embodiments are also intended to include and otherwise cover alternate brake assemblies including rotating and fixed members, such as drum brake assemblies. In FIG. 1, each of the brake calipers 28L,R, 34L,R is adjacent a contact portion of the respective brake discs 26L,R, 32L,R, and is configured to cause the respective brake pads 30L,R, 36L,R to clamp the contact portion.

The brake discs 26L,R, 32L,R may be solid, cross-drilled, slotted, or waved, and the brake calipers 28L,R, 34L,R may have an adequate number of pistons to achieve desired braking effects, such as one, two, four, six, etc. The calipers 28L,R, 34L,R can be fixed calipers or floating calipers. Additionally, the brake discs 26L,R, 32L,R may be made of cast-iron, steel, or carbonceramic composite, while the brake calipers 28L,R, 34L,R may be made of cast-aluminum or cast-iron. However, embodiments are intended to cover forming these components from any beneficial material.

As described below, the braking system 12 of the exemplary vehicle 10 also includes front and rear hydraulic lines 38, 39 connecting the brake calipers 28L,R, 34L,R to a brake modulator 40 positioned within the vehicle 10. The brake modulator 40 can include a master cylinder and a brake booster to convert user input via a brake pedal 42 (or other manually actuable device) to hydraulic pressure, as described below. The brake modulator 40 is in turn connected to the brake pedal 42, and upon input from a user (such as a driver of the vehicle 10), pressing the brake pedal 42 causes the brake modulator 40 to pressurize the hydraulic lines 38, 39 with hydraulic fluid, thereby causing the brake calipers 28L,R, 34L,R to clamp the contact portions of the respective brake discs 26L,R, 32L,R.

The brake modulator 40 can be any appropriate device, system or component that can alter the fluid pressure in any combination of the brake assemblies 22L,R, 24L,R independently of the vehicle operator's input via the brake pedal 42. Exemplary embodiments are intended to include a brake modulator 40 that can adjust brake pressure simultaneously and equally to all of the brake assemblies 22L,R, 24L,R. Exemplary embodiments are also intended to include a brake modulator that can provide a unique brake pressure to each of the brake assemblies 22L,R, 24L,R. Further details of an exemplary brake modulator in accordance with the disclosed subject matter will be provided below.

When the exemplary vehicle 10 is in motion and the wheels 16L,R, 20L,R are rotating, the brake discs 26L,R, 32L,R are also rotating due to being fixed with the wheels 16L,R, 20L,R. Clamping the contact portions of the brake discs 26L,R, 32L,R creates friction between the brake pads 30L,R, 36L,R and the brake discs 26L,R, 32L,R, slowing rotation of both the brake discs 26L,R, 32L,R and the wheels 16L,R, 20L,R simultaneously. As rotation of the wheels 16L,R, 20L,R slow, the vehicle 10 slows down accordingly and may ultimately come to a complete stop.

As discussed above, ABS involves monitoring wheel speed to determine whether wheels are slipping under braking force. Therefore, the exemplary embodiment includes front wheel sensors 44L,R and rear wheel sensors 46L,R positioned adjacent the front wheels 16L,R and the rear wheels 20L,R, respectively. The wheel sensors 44L,R, 46L,R measure a rotational velocity of the respective wheels 16L,R, 20L,R and transmit those measurements to an ABS control module 48 via sensor lines 54.

The ABS control module 48 includes both a control processor 50 and a control memory 52 that function together to provide ABS control over the front axle 14 and the rear axle 18 of the vehicle 10. The ABS control module 48 may also be configured to provide ABS control over both of the wheels 16L,R of the front axle 14, or over either of the wheels 16L,R individually. Similarly, ABS control may be provided by the ABS control module 48 over both of the wheels 20L,R of the rear axle 18, or over either of the wheels 20L,R individually. Both of the above-described circumstances may be analyzed to determine whether an axle is under ABS control. As described above, the ABS control module 48 receives rotational velocity measurements of the wheels 16L,R, 20L,R, and then determines whether any of the wheels 16L,R, 20L,R have begun slipping (i.e., rotational velocity of the wheel is less than what a rotational velocity of a free-rolling wheel at an identical vehicle speed would be) due to a brake caliper slowing rotation of a brake disc proportionately more than speed of the vehicle is decreasing, thereby causing a wheel connected to the brake disc to slide along a travel surface at a rotational velocity less than free-rolling. As will be discussed below, in embodiments featuring regenerative braking, a regeneration motor may be implemented instead of a brake caliper to slow rotation of the respective wheel. In the present embodiment, the ABS control module 48 can permit an amount of slipping in the wheels 16L,R, 20L,R before the wheels 16L,R, 20L,R are considered to "begin slipping," thus having a target slip rate which the wheels 16L,R, 20L,R must reach to qualify as slipping. The target slip rate can help the vehicle 10, specifically the wheels 16L,R, 20L,R, maintain grip/traction with the surface on which the vehicle 10 is traveling while retaining stability and the ability to steer. As mentioned above, a slip rate is a ratio of a rotational velocity of a wheel (typically under braking force) compared to a rotational velocity of a free-rolling wheel (absent braking resistance, or regenerative braking through implementation of a regeneration motor as referenced above) at an identical vehicle speed. To illustrate this concept, a slip rate of zero percent equates to a wheel that is rolling freely, while a slip rate of 100% equates to a wheel that is fully locked and not rotating at all. For example, a target slip rate in some embodiments may therefore be approximately 10 percent, meaning that the wheels 16L,R, 20L,R will not be considered to have begun slipping until their rotational velocity is 10 percent less than what a rotational velocity of a free-rolling wheel would be at an identical vehicle speed. Embodiments may have target slip rates greater than or less than 10 percent as the previous example is for illustrative purposes. Slipping of the wheels 16L,R, 20L,R is detected when the wheel sensors 44L,R, 46L,R measure disproportionately decreased rotational velocity of the respective wheels 16L,R, 20L,R, indicating that the wheels 16L,R, 20L,R are slipping. After detecting slipping of the wheels 16L,R, 20L,R, the control processor 50 of the ABS control module 48 can enter ABS control over appropriate brake assemblies 22L,R, 24L,R via the brake modulator 40, which is described below.

In the exemplary embodiment, the ABS control module 48 can be linked with (or combined with) a vehicle stability control module that can control stability of the vehicle by modulating hydraulic pressure to a brake assembly to slow rotation of any given wheel, as described above. Modulation by the ABS control module 48 can include increasing or decreasing adjustment of the brake assemblies 22L,R, 24L,R by an appropriate amount to achieve balanced operation of the respective wheels 16L,R, 20L,R. Specifically, modulating the hydraulic pressure may necessitate increasing or reducing pressure in the hydraulic lines 38,39 to actuate or release actuation of the brake assemblies 22L,R, 24L,R. The ABS control module 48 may also be linked to a brake actuator such as in instances of regenerative braking including regeneration motors configured to slow rotation of a wheel, as well as a brake booster.

The exemplary brake modulator 40 shown in FIG. 1 can include a valve assembly 56 connected to a pressurized fluid source 60, and a pressure sensor 58. Pressurized fluid flows between the fluid source 60 and the hydraulic lines 38, 39 pursuant to a disposition of the valve assembly 56, which is controlled by the control processor 50 of the ABS control module 48 via signals transmitted through the control line 62. The control line 62 connects the valve assembly 56, the fluid source 60, and the pressure sensor 58 to the ABS control module 48. The pressure sensor 58 measures and transmits the hydraulic pressure in the hydraulic lines 38, 39 to the ABS control module 48, thereby allowing the control processor 50 to determine an appropriate disposition of the valve assembly 56 to facilitate hydraulic fluid flow to achieve a desired hydraulic pressure. For example, the control processor 50 can dispose the valve assembly 56 to supplement hydraulic pressure in the hydraulic lines 38, 39 as a result of input from the driver in the form of actuating the brake pedal 42. Alternatively, the control processor 50 can dispose the valve assembly 56 to reduce hydraulic pressure as a result of input from the driver in the form of releasing the brake pedal 42.

III. Method of Operation

FIG. 2 is a flowchart depicting an algorithm in accordance with the disclosed subject matter. The ABS control module 48 of the braking system 12 can employ the algorithm described below during instances of driving when the vehicle 10 is in a state of motion, either traveling forward or backward along a surface of travel, hereinafter referred to as a travel surface.

When the vehicle 10 is being driven and is in motion, the control processor 50 of the ABS control module 48 may begin an initial step of the algorithm by initiating a start step S100. Once the control processor 50 has initiated the start step S100, the algorithm proceeds to a brake inquiry step S102 to determine whether the driver has actuated the braking system 12 by actuating the brake pedal 42. The brake pedal 42 can be actuated manually by the driver, or automatically actuated by an autonomous system. As described above, pressing the brake pedal 42 modulates pressure in the hydraulic lines 38, 39 and causes the brake calipers 28L,R, 34L,R to clamp the brake discs 26L,R, 32L,R accordingly. The control processor 50 can in turn detect the pressure modulation in the hydraulic lines 38, 39 via the control line 62 connected to the pressure sensor 58 of the brake modulator 40. If the control processor 50 does detect modulated pressure in the hydraulic lines 38, 39 resulting from the driver actuating the brake pedal 42, the algorithm proceeds to a first ABS inquiry step S104 described below. However, if the control processor 50 does not detect a pressure modulation in the hydraulic lines 38, 39, then the driver is determined to have not actuated the brake pedal 42, and the control processor 50 proceeds to an end step S124 and exits the algorithm without performing additional steps.

The first ABS inquiry step S104 of the algorithm determines whether a single axle of the vehicle 10, such as the front axle 14, is under ABS control. In other words, at this step the control processor 50 determines whether ABS control has been entered over either the front axle 14 or the rear axle 18 due to the wheels 16L,R, 20L,R slipping on the travel surface under braking. The control processor 50 may further determine whether ABS control has been entered over each individual wheel 16L,R, 20L,R of either the front axle 14 or the rear axle 18. As described above, the wheels 16L,R, 20L,R and connected brake discs 26L,R, 32L,R can disproportionately slow rotating due to clamping force of the calipers 28L,R, 34L,R overcoming frictional grip of the wheels 16L,R, 20L,R (through the tires) to the travel surface. If either the front wheels 16L,R or the rear wheels 20L,R begin slipping, rotational velocity measurements of the corresponding wheel sensors 44L,R, 46L,R being transmitted to the ABS control module 48 reflect the slipping. The ABS control module 48 then actuates ABS control over the slipping wheels.

As discussed above, front brake bias can cause the front wheels 16L,R to slip and enter ABS control before the rear wheels 20L,R slip and enter ABS control. Under these circumstances, both the front axle 14 and the rear axle 18 may not be under ABS control simultaneously for a variety of reasons. For example, in the exemplary embodiment and as described above, pressing the brake pedal 42 applies a greater braking force of the braking system 12 to the front axle 14 than the rear axle 18. Therefore, the greater braking force applied to the front axle 14 may cause the front axle 14 to slip and actuate ABS control while a lesser braking force applied to the rear axle 14 is not sufficient to cause slipping of the rear axle 14 and actuate ABS control. In this manner, a single axle of the vehicle 10 (such as the front axle 14) may be under ABS control while another axle (such as the rear axle 18) is not under ABS control. Alternatively, the front wheels 16L,R may be traveling over a travel surface with a surface-mu lower than that of a travel surface over which the rear wheels 20L,R are traveling. Therefore, a braking force may cause the front wheels to enter ABS control due to the more slippery surface, while ABS control is not entered over the rear wheels. If a single axle is under ABS control, then the control processor 50 proceeds to a first surface verification step S106 of the algorithm described below. However, if ABS control has not been actuated over either the front axle 14 or the rear axle 18, then the control processor 50 proceeds to an end step S124 and exits the algorithm without performing additional steps.

As described above, each potential travel surface has a surface-mu value representative of the slipperiness of the travel surface, measured as a coefficient of friction, μ. For instance, a snow-covered road may have a higher surface-mu value than that of an ice-covered road, a rain-covered road may yet have a higher surface-mu value than that of a snow-covered road, and a dry asphalt surface may yet have a higher surface-mu value than that of a rain-covered road. The following step of the algorithm determines whether or not actuating ABS control over the wheels 16L,R, 20L,R of the vehicle 10 will be beneficial based on conditions of the travel surface.

Once the control processor 50 has determined that a single axle is under ABS control, the algorithm then enters the first surface verification step S106 to determine whether a surface-mu value of the travel surface is permissible by being within a surface-mu value. The surface-mu range includes all coefficients of friction of surfaces of travel on which the algorithm is intended to operate. In other words, the first surface verification step S106 analyzes whether or not properties of the travel surface are appropriate for actuation of ABS control, given the hydraulic pressure resulting from the driver input on the brake pedal 42, which is hereinafter referred to as system brake pressure and will be further described below. For example, the vehicle 10 may be traveling on an ice-covered surface or a snow-covered surface, and the surface-mu value of one surface may be impermissible for operation of the algorithm, while the other surface represents a permissible surface-mu value for advancing to the next step of the algorithm. If the surface-mu value is permissible, then the algorithm proceeds to the first pressure range step S108 described below. However, if the surface-mu value is not permissible, then the control processor 50 proceeds to an end step S124, and exits the algorithm without performing additional steps.

After the surface-mu value determination of the first surface verification step S106, the control processor 50 then determines whether a system brake pressure is an acceptable value at the first pressure range step S108. In other words, the algorithm checks the system brake pressure resulting from the driver input via the brake pedal 42 to interpret the driver's intent regarding a path of travel of the vehicle 10. In embodiments featuring an autonomous system for automatically actuating the brake pedal 42, the algorithm checks the system brake pressure resulting from the autonomous system input via the brake pedal 42 to interpret the autonomous system's intent regarding a path of travel of the vehicle 10.

For illustrative purposes, the following describes an embodiment in which the brake pedal 42 can be actuated manually by the driver. The first pressure range step S108 analyzes whether the driver briefly tapped and then released the brake pedal 42 indicative of intent for a minor adjustment to the path of the vehicle 10, or if the driver applied an emergency braking force to the brake pedal 42 indicative of intent to quickly reduce speed of the vehicle 10 and potentially come to a complete stop, dramatically altering the path of the vehicle 10. The algorithm can define an acceptable value of the system brake pressure as that which indicates that the driver intends to quickly reduce speed of the vehicle 10 and potentially come to a complete stop, dramatically altering the path of the vehicle 10. The aforementioned acceptable value of the system brake pressure as defined by the algorithm represents a tunable range, and can be adjusted to encompass any amount of system brake pressure such as under light, moderate, or heavy braking. At this step, if the algorithm determines that the system brake pressure is an acceptable value, the algorithm proceeds to the next step described below. However, if the system brake pressure is not an acceptable value, then the control processor 50 proceeds to an end step S124 and exits the algorithm without performing additional steps.

Next, the control processor 50 will enter a modulate pressure step S110. In the modulate pressure step S110, the algorithm autonomously modulates the hydraulic pressure to enter ABS control over the other axle that was not put under ABS control from the aforementioned system brake pressure due to driver input. As described above, for the control processor 50 to reach this step in the algorithm, it must have been determined that a single axle is under ABS control. The current step therefore achieves ABS control on both axles 14, 18 by modulating system brake pressure to enter ABS on the other axle. Specifically, the algorithm results in the control processor 50 causing the brake modulator 40 to modulate hydraulic pressure in the hydraulic lines 38, 39 connected to the other axle until the other axle begins slipping and ABS control is entered. For example, hydraulic pressure in the hydraulic lines 39 is modulated to enter ABS control over the rear axle 18.

After the control processor 50 autonomously modulates the hydraulic pressure at the modulate pressure step S110 of the algorithm to enter ABS on the other axle, the control processor 50 will enter a second surface verification step S112 of a pressure modulation section of the algorithm that, as described below, is repeated until the control processor 50 verifies that the driver input (via the brake pedal 42) does alter the intended braking pressure by the threshold amount. For example, as described below, if the front axle 14 is under ABS control and the rear axle 18 is not, the control processor 50 will continually modulate hydraulic pressure to the rear brake assemblies 24L,R of the rear axle 18 to actuate ABS control. This next step determines whether the surface-mu value is still permissible. In other words, the second surface verification step S112 analyzes whether or not properties of the travel surface have changed, and if any change to the surface-mu is still within the permissible surface-mu range. For example, the vehicle 10 may transition from an ice-covered surface to a dry asphalt surface, changing the surface-mu value during progression of the algorithm by the control processor 50.

If the surface-mu value does not change or changes but is still permissible, then the processor 50 proceeds to a second pressure range step S114 of the pressure modulation section of the algorithm described below. However, if the surface-mu value changes to an impermissible surface-mu value, then the processor 50 exits the pressure modulation section and proceeds to a pressure reduction step S122 to reduce brake pressure back to the intended system brake pressure, which is the hydraulic pressure that was originally requested by the driver via the brake pedal 42. In other words, the driver input (through the brake pedal 42) controls the brake pressure applied again to brake assemblies 22L,R, 24L,R at both the front axle 14 and the rear axle 18, and the processor 50 then proceeds to the end step S124 of the algorithm. For example, the driver may only have pressed the brake pedal 42 to a sufficient degree to enter ABS control over the front axle 14 and not the rear axle 18. Therefore, reducing hydraulic pressure back to the driver requested system brake pressure may serve to release the rear axle 18 from ABS control while maintaining ABS control over the front axle 14.

As described above, the second pressure range step S114 of the pressure modulation section occurs if the surface-mu value remains permissible. The algorithm again checks to determine whether the system brake pressure is still an acceptable value. In other words, the algorithm checks the system brake pressure resulting from the driver input to interpret the driver's intent regarding a path of travel of the vehicle 10, and whether or not the driver's intent has changed since initialization of the algorithm. For example, this step analyzes whether the driver has partially or completely released the brake pedal 42 since initially pressing the brake pedal 42, indicating a change in the intent of the driver regarding the desired path for the vehicle 10. As described above, the algorithm can define an acceptable value of the system brake pressure as that which indicates that the driver intends to quickly reduce speed of the vehicle 10 and potentially come to a complete stop, dramatically altering the path of the vehicle 10. Therefore, if the driver has not partially or completely released the brake pedal 42 and instead maintains the driver input via the brake pedal 42, then the algorithm will determine that the system brake pressure is still an acceptable value, and the control processor 50 proceeds to a double axle ABS step S116 of the algorithm described below. However, if the driver has partially or completely released the brake pedal 42, indicating an intent not to dramatically altering the path of the vehicle 10 by quickly reducing the speed of the vehicle 10 or coming to a complete stop, then the control processor 50 exits the pressure modulation section of the algorithm and proceeds to the pressure reduction step S122 to reduce brake pressure back to that which was originally requested by the driver input into the brake system 12 via the brake pedal 42.

If the system brake pressure is still an acceptable value, then the control processor 50 enters double axle ABS step S116 of the pressure modulation section of the algorithm. At this step, the control processor 50 determines whether both axles are under ABS control. Due to changing conditions, such as surface-mu value and system brake pressure, the initial autonomous modulation in system brake pressure may not have been sufficient to maintain ABS control over both axles. This step of the modulate pressure section verifies whether the initial modulation in system brake pressure was sufficient to enter ABS control over both axles, and if it was indeed sufficient and both axles are under ABS control, then the algorithm then exits the pressure modulation section and proceeds to the next step described below. However, if both axles are not under ABS control because, for example, the initial modulation in system brake pressure was insufficient to do so, then the control processor 50 exits the pressure modulation section of the algorithm and proceeds to the pressure reduction step S122 to reduce brake pressure back to that which was originally requested by the driver input into the brake system 12 via the brake pedal 42.

After exiting the pressure modulation section, the control processor 50 proceeds to a pressure maintenance step S118 and maintains autonomous supplemental pressure based on the driver input. In other words, the algorithm maintains the modulated system brake pressure to keep both axles under ABS control if the driver input on the braking system 12 via the brake pedal 42 is maintained.

The control processor 50 then enters driver pressure reduction step S120 and determines whether the driver intended braking pressure reaches a threshold by partially or completely releasing the brake pedal 42. In other words, if the driver releases the brake pedal 42, the algorithm interprets the driver input as intending to reduce the system brake pressure. The threshold of the driver intended braking pressure may be appropriate to reflect the driver's intention to no longer dramatically alter the path of the vehicle 10 by quickly reducing the speed of the vehicle 10 or come to a complete stop. For example, the driver may no longer wish to apply the brake system 12 to slow the vehicle 10 as the vehicle 10 has been sufficiently slowed. Therefore, if the driver input (via the brake pedal 42) does alter the intended braking pressure by the threshold amount, then the control processor 50 proceeds to the pressure reduction step S122 before proceeding to the end step S124 and exiting the algorithm, as described below. However, if the driver is not altering the intended braking pressure by the threshold amount because the driver is either maintaining input via the brake pedal 42 or is altering input via the brake pedal 42 by less than the threshold amount, then the control processor 50 then restarts the pressure modulation section, and again proceeds to check the surface-mu value and the system brake pressure before returning to the double axle ABS step S116 to determine whether or not both axles are under ABS control, after which the control processor 50 proceeds to the pressure maintenance step S118 and maintains autonomous supplemental pressure based on the driver input, followed by a return to the driver pressure reduction step S120 to determine whether the driver intended braking pressure is reduced yet. This pressure modulation section is repeated until the control processor 50 verifies that the driver input (via the brake pedal 42) does alter the intended braking pressure by the threshold amount, at which point the control processor 50 proceeds to the pressure reduction step S122 before proceeding to the end step S124 and exiting the algorithm.

Finally, if the driver does alter intended braking pressure by the threshold amount via the driver input on the brake pedal 42, then the algorithm reduces system brake pressure to the driver intended system brake pressure, and the control processor 50 proceeds to the end step S124 and exits the algorithm. As described above, at this stage, the driver input through the brake pedal 42 once again controls the brake pressure applied to both the front axle 14 and the rear axle 18.

By entering ABS control on both axles instead of a single axle, the vehicle 10 is able to decelerate more quickly. Particularly, the vehicle 10 is capable of slowing and stopping more effectively in relation to the driver input on relatively slippery surfaces such as snow, ice, rainwater, etc. More effective stopping and slowing yields more control over the vehicle 10 for the driver in instances of changing the path of the vehicle 10. Under certain conditions, the driver may be unaware of how slippery a travel surface is, and therefore may not cause an appropriate hydraulic pressure in the hydraulic lines 38, 39 via the brake pedal 42 to effectively slow the vehicle 10. The algorithm assists the driver in effectively slowing the vehicle 10 by supplementing insufficient hydraulic pressure input from the brake pedal 42.

The above-described steps may also be performed in any appropriate order to achieve the described functionality of the brake system, and the brake system is thus not intended to be limited in functionality to the order of steps shown and described in the exemplary embodiment and shown in FIG. 2. For example, steps S102, S104, S106, and S108 may be performed in any appropriate order to achieve the braking modulation outlined above.

IV. Alternative Embodiments

While certain embodiments of the invention are described above, and FIGS. 1-2 disclose the best mode for practicing the various inventive aspects, it should be understood that the invention can be embodied and configured in many different ways without departing from the spirit and scope of the invention.

For example, in the disclosed embodiments, the disclosed algorithm is applied to a disc brake system of a vehicle. However, the disclosed algorithm may alternatively be used with any type of braking system, such as drum brake systems, regenerative braking systems, and/or other types of braking systems.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles. Particularly, the algorithm may be used in conjunction with a regenerative braking system of a vehicle having an electric motor.

In the disclosed embodiment, the algorithm is used with a passenger vehicle having two pairs of wheels referred to as a front axle and a rear axle. However, the algorithm may additionally be used with a heavy duty vehicle having multiple axles (pairs of wheels) such as three, four, five, or any number of appropriate pairs of wheels.

The algorithm may also be used with braking systems including brake modulators having any appropriate number of valves such as one, two, three, etc. and any appropriate number of hydraulic lines connecting the valves to brake assemblies. Furthermore, the brake system may include additional components, such as an accumulator, master cylinder, brake booster, etc., in configurations other than those discussed. The braking system and connecting lines may also be pneumatic or electromagnetic instead of hydraulic.

Embodiments are also intended to include or otherwise cover methods of using and methods of manufacturing any or all of the elements disclosed above. The methods of manufacturing include or otherwise cover processors and computer programs implemented by processors used to design various elements of the vehicle braking apparatus disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A brake system for use with a vehicle that includes front and rear wheels that are configured for rotation on a surface upon which the vehicle travels, the brake system comprising:

multiple brake assemblies including a front brake assembly provided at the front wheel, and a rear brake assembly provided at the rear wheel;

a brake modulator that is configured to cause each of the brake assemblies to engage and thereby reduce speed of rotation of the associated wheel, via one of a normal mode in which the brake assembly substantially continuously reduces speed of rotation, and a pulsing mode in which the brake assembly sporadically modulates speed of rotation;

a sensor that is configured to sense at least one condition relating to interaction between at least one of the wheels and the surface upon which the vehicle travels; and a controller that receives data from the sensor and that is configured to instruct the brake modulator to cause the front brake assembly to modulate the speed of rotation of the front wheel via one of the normal mode and the pulsing mode based on the sensed data, the controller also being configured to instruct the brake modulator to cause the rear brake assembly to modulate a braking force applied to the rear wheel until the rear wheel slips, and then to instruct the rear brake assembly to reduce the speed of rotation of the rear wheel via the pulsing mode if the front brake assembly is engaged in reducing the speed of rotation of the front wheel via the pulsing mode.

2. The brake system according to claim 1, wherein the controller is configured to instruct the brake modulator to cause the rear brake assembly to modulate the speed of rotation of the rear wheel via the pulsing mode if a coefficient of friction between one of the front and rear wheels and the surface upon which the vehicle travels is determined to have reached a threshold.

3. The brake system according to claim 1, wherein the controller is configured to instruct the brake modulator to cause the rear brake assembly to modulate the speed of rotation of the rear wheel via the pulsing mode if a coefficient of friction between one of the front and rear wheels and the surface upon which the vehicle travels is determined to be within a predetermined range.

4. The brake system according to claim 3, wherein the brake modulator includes a source of fluid and a valve assembly that selectively provides pressurized or depressurized fluid to the brake assemblies to cause each of the brake assemblies to engage and thereby reduce speed of rotation of the associated wheel.

5. The brake system according to claim 4, wherein the controller is configured to instruct the brake modulator to cause the rear brake assembly to modulate the speed of rotation of the rear wheel via the pulsing mode if a pressure of the pressurized or depressurized fluid supplied to the brake assemblies reaches a threshold pressure.

6. The brake system according to claim 5, further including a brake pedal that is configured to be manually actuated in an actuation direction to instruct the valve assembly of the brake modulator to provide the pressurized or depressurized fluid to the brake assemblies to cause each of the brake assemblies to engage and thereby reduce speed of rotation of the associated wheel.

7. The brake system according to claim 5, wherein the controller is configured, if the front and rear brake assemblies are both operating in the pulsing mode, to instruct the brake modulator to continue operating the rear brake assembly in the pulsing mode until the pressure of the pressurized or depressurized fluid supplied to the brake assemblies is modulated.

8. The brake system according to claim 6, wherein the controller is configured, if the front and rear brake assemblies are both operating in the pulsing mode, to instruct the brake modulator to continue operating the rear brake assembly in the pulsing mode until the brake pedal moves in a direction opposite to the actuation direction.

9. The brake system according to claim 2, wherein the controller is configured, if the front and rear brake assemblies are both operating in the pulsing mode, to instruct the brake modulator to continue operating the rear brake assembly in the pulsing mode until the coefficient of friction between one of the front and rear wheels and the surface upon which the vehicle travels is determined to have reached the threshold.

10. The brake system according to claim 3, wherein the controller is configured, if the front and rear brake assemblies are both operating in the pulsing mode, to instruct the brake modulator to continue operating the rear brake assembly in the pulsing mode until the coefficient of friction between one of the front and rear wheels and the surface upon which the vehicle travels is determined to be outside of the predetermined range.

11. A control assembly for a brake system for a vehicle that includes front and rear wheels that are configured for rotation on a surface upon which the vehicle travels, the brake system including multiple brake assemblies including a front brake assembly provided at the front wheel, and a rear brake assembly provided at the rear wheel, and a brake modulator that is configured to cause each of the brake assemblies to engage and thereby reduce speed of rotation of the associated wheel, via one of a normal mode in which the brake assembly substantially continuously reduces speed of rotation, and a pulsing mode in which the brake assembly sporadically modulates speed of rotation, the control assembly comprising:
 a sensor that is configured to sense at least one condition relating to interaction between at least one of the wheels and the surface upon which the vehicle travels; and
 a controller that receives data from the sensor and that is configured to instruct the brake modulator to cause the front brake assembly to modulate the speed of rotation of the front wheel via one of the normal mode and the pulsing mode based on the sensed data, the controller also being configured to instruct the brake modulator to cause the rear brake assembly to modulate a braking force applied to the rear wheel until the rear wheel slips, and then to instruct the rear brake assembly to reduce the speed of rotation of the rear wheel via the pulsing mode if the front brake assembly is engaged in reducing the speed of rotation of the front wheel via the pulsing mode.

12. The control assembly according to claim 11, wherein the controller is configured to instruct the brake modulator to cause the rear brake assembly to modulate the speed of rotation of the rear wheel via the pulsing mode if a coefficient of friction between one of the front and rear wheels and the surface upon which the vehicle travels is determined to have reached a threshold.

13. The control assembly according to claim 11, wherein the controller is configured to instruct the brake modulator to cause the rear brake assembly to modulate the speed of rotation of the rear wheel via the pulsing mode if a coefficient of friction between one of the front and rear wheels and the surface upon which the vehicle travels is determined to be within a predetermined range.

14. The control assembly according to claim 13, wherein the brake modulator includes a source of fluid and a valve assembly that selectively provides pressurized or depressurized fluid to the brake assemblies to cause each of the brake assemblies to engage and thereby reduce speed of rotation of the associated wheel.

15. The control assembly according to claim 14, wherein the controller is configured to instruct the brake modulator to cause the rear brake assembly to modulate the speed of rotation of the rear wheel via the pulsing mode if a pressure of the pressurized or depressurized fluid supplied to the brake assemblies reaches a threshold pressure.

16. The control assembly according to claim 15, further including a brake pedal that is configured to be manually actuated in an actuation direction to instruct the valve assembly of the brake modulator to provide the pressurized or depressurized fluid to the brake assemblies to cause each of the brake assemblies to engage and thereby reduce speed of rotation of the associated wheel.

17. The control assembly according to claim 15, wherein the controller is configured, if the front and rear brake assemblies are both operating in the pulsing mode, to instruct the brake modulator to continue operating the rear brake assembly in the pulsing mode until the pressure of the pressurized or depressurized fluid supplied to the brake assemblies is modulated.

18. The control assembly according to claim 16, wherein the controller is configured, if the front and rear brake assemblies are both operating in the pulsing mode, to instruct the brake modulator to continue operating the rear brake assembly in the pulsing mode until the brake pedal moves in a direction opposite to the actuation direction.

19. The control assembly according to claim 12, wherein the controller is configured, if the front and rear brake assemblies are both operating in the pulsing mode, to instruct the brake modulator to continue operating the rear brake assembly in the pulsing mode until the coefficient of friction between one of the front and rear wheels and the surface upon which the vehicle travels is determined to have reached the threshold.

20. A method of operating a brake system for a vehicle that includes front and rear wheels that are configured for rotation on a surface upon which the vehicle travels, the brake system including multiple brake assemblies including a front brake assembly provided at the front wheel, and a rear brake assembly provided at the rear wheel, and a brake modulator that is configured to cause each of the brake assemblies to engage and thereby reduce speed of rotation of the associated wheel, via one of a normal mode in which the brake assembly substantially continuously reduces speed of rotation, and a pulsing mode in which the brake assembly sporadically modulates speed of rotation, the method comprising:
 sensing at least one condition relating to interaction between at least one of the wheels and the surface upon which the vehicle travels;
 instructing the brake modulator to cause the front brake assembly to modulate the speed of rotation of the front wheel via one of the normal mode and the pulsing mode based on the sensed at least one condition; and
 instructing the brake modulator to cause the rear brake assembly to modulate a braking force applied to the rear wheel until the rear wheel slips, and then to instruct the rear brake assembly to reduce the speed of rotation of the rear wheel via the pulsing mode if the front brake assembly is engaged in reducing the speed of rotation of the front wheel via the pulsing mode.

* * * * *